Sept. 22, 1964 D. J. BLATTNER 3,150,325

WIDE BAND TRAVELING WAVE PARAMETRIC AMPLIFIER

Filed April 12, 1962

INVENTOR

DONALD J. BLATTNER

BY [signature]

AGENT.

United States Patent Office 3,150,325

Patented Sept. 22, 1964

3,150,325
WIDE BAND TRAVELING WAVE PARAMETRIC AMPLIFIER

Donald J. Blattner, Princeton, N.J., assignor, by mesne assignments, to the United States of America as represented by the Secretary of the Navy Filed Apr. 12, 1962, Ser. No. 187,137
1 Claim. (Cl. 330—4.6)

This invention relates to parametric wave amplifiers, and more particularly to a wide band parametric traveling wave amplifier wherein a strip transmission line is employed to maintain constant phase relations among signal waves of differing frequencies traveling therealong, one of the waves being amplified by the action of the non-linear transfer of energy of another wave thereto.

In typical parametric wave amplifiers, an input signal to be amplified is applied to a non-linear reactance to which is also applied an alternating current driving or pump signal of constant frequency. Due to the non-linear reactance, the energy of the pump wave is transferred to the input wave. A primary advantage of the parametric wave amplifier is that resistive elements producing current noise may be eliminated. A non-linear inductance or a capacitance may be used as the non-linear element, and the circuit may comprise several tank circuits connected in common with the non-linear element. One of the tank circuits is resonant with the constant pump frequency, $f_p$; another tank circuit is resonant with the input frequencies, $f_s$, to be amplified, and the third tank circuit is resonant with the sum or difference "idler" frequency designated $f_i$, which is equal to $f_p \pm f_s$. The three circuits may take the form of a single cavity having three resonant modes with frequencies $f_s$, $f_p$, and $f_i$.

In a typical parametric wave amplifier, an energy transfer relationship takes place as discussed in the "Inverting Modulator" case of Manley and Rowe's paper entitled "Some General Properties of Non-Linear Elements—Part I. General Energy Relations," Proc. of the I.R.E., vol. 44, No. 7 of July 1956, pp. 904–913. If $E_s$ and $E_i$ represent the power delivered to the input and the idler waves respectively by the pump wave, then as pointed out by Manley and Rowe in the above paper, $$E_s = E_i(f_s/f_i), \text{ or } E_s/E_i = f_s/f_i$$

It is seen that the lower the frequency of the idler wave $f_i$, the higher the ratio of signal power to idler power. Since $f_i = f_p \pm f_s$, the lower idler frequency condition is met by selecting the difference or idler frequency, $$f_i = f_p - f_s$$

In order to overcome the disadvantage of a narrow amplifier band-width and the appearance of the input and output on the same terminals in those types of parametric amplifiers utilizing a single non-linear reactance element, it was proposed in an article published by Englebrecht in Proc. of the I.R.E., vol. 46, No. 9 of Sept. 1958, page 1655, to transmit the pump, signal, and idler waves down the same artificial transmission line, insuring that the idler frequency $f_i = f_p - f_s$, and that the sum frequency, $(f_p + f_s)$ is reactively terminated.

However, it is difficult to design a transmission line whrein the pump, input, and idler waves travel therethrough in the same phase relations at essentially all amplifier operating frequencies because discontinuities producing dispersion cause phase differences which increase noise, thus reducing the signal-to-noise ratio of the amplifier.

According to the present invention, the above and other difficulties and disadvantages are overcome by providing a strip transmission line to which the pump and input are applied. Electromagnetic wave propagation on a strip line is essentially dispersionless, and, therefore, the pump, input and idler waves travel down the line at the same velocity. Non-linear reactance means connected across the strip line at regular intervals thereon parametrically amplify the input signal wave and provide a stop band for the undesired sum frequencies of the pump and input waves. Suitable reactance means may be provided to reactively terminate the pump and idler waves.

It is, accordingly, an object of the present invention to substantially eliminate phase distortion in a wide band parametric traveling wave amplifier.

Another object of this invention is to provide a parametric traveling wave amplifier having an essentially dispersionless transmission line for electromagnetic propagation thereon of pump and input and idler waves in the same phase, whereby noise due to phase differences in the amplifier is greatly reduced.

Yet another object of this invention is the provision in a wide band traveling wave parametric amplifier of elimination of unwanted waves and amplification of input signal waves without phase distortion.

These and other objects and advantages of the present invention will be better understood by referring to the accompanying drawings in which.

Figures 1, 2:
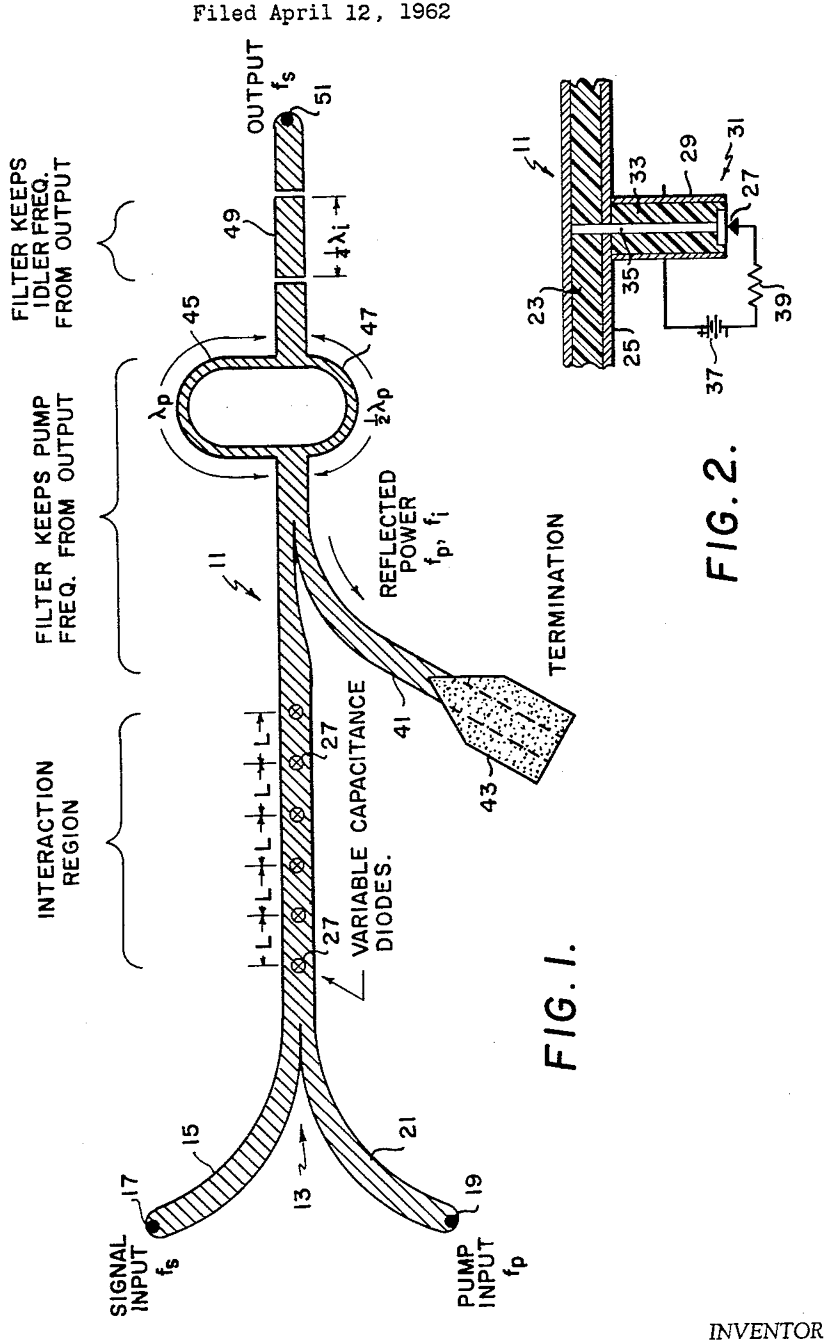
FIG. 1 is a top view of a parametric amplifier according to the invention.
FIG. 2 is a cross-sectional view of a portion of the strip line according to the invention.

Referring to FIGS. 1 and 2, a metallic strip transmission line has an input end 13 in the form of a T into one leg 15 of which is applied through a suitable coaxial connector 17 a microwave or U.H.F. input signal $f_s$ to be amplified. A pump signal, $f_p$, of a constant frequency preferably about twice the average frequency of the input signal, $f_s$, is applied through a suitable coaxial connector 19 to the other leg 21 of the T 13. The strip line 11 may be conventionally mounted on a dielectric insulating board 23 beneath which is a metallic plate forming the ground plane 25 for the strip line 11.

Each of a plurality of variable capacitance diodes 27 for non-linearly transferring energy between the interacting signals, $f_s$, $f_p$, is electrically connected across the strip line 11 to the ground plane 25, each of the diodes 27 being separated from each respective adjacent diode at equal intervals L along the strip line 11.

As shown in FIG. 2 each of the diodes 27 has an associated section of the strip line 29 forming a tank circuit. Although the parameters may be adjusted so that parametric oscillations will be sustained at any permissible frequency, the preferred frequency of the effective tank circuit is ½ the pump frequency. A transducer 31 includes an outer conductor 33 connected to the ground plate 25, and an inner conductor 35 which passes through an aperture in the ground plate to make electrical connection with the strip transmission line 11. Suitable impedance matching may be provided. The transducer 31 may have a mounting at its termination for each of the variable capacitance diodes 27. The cathode of each of the diodes 27 is back biased by a suitable source of potential, such as by a battery 37. The positive terminal of the battery 37 is connected to the outer conductor 33, and the negative terminal of the battery 37 is connected to the anode of each of the diodes 27 through a resistor 39. Each of the diodes 27 and its associated biasing source 37 may be reversed, if desired.

The region of the strip line 11 in which the diodes 27 are connected will hereinafter be designated the "interaction region" between the pump signal, $f_p$, and the input signal $f_s$. The term "variable capacitance diodes" refers to those types of diodes, well known in the art, which have the characteristic property of exhibiting a change in capacitance as a function of the voltage applied thereacross.

The spacing of the diodes 27 is important. The interval between each of the equally spaced diodes 27 is indicated by the letter L, and it is the apt choice of this interval, L, between the respective diodes 27 which produces a region of interaction between the pump signal, $f_p$, and the input signal, $f_s$, so that a low pass filter blocks waves traveling down the line 11 of frequencies above the value of the lowest sum frequency $f_p+f_s$(min.). The stop band is produced by making the spacing L between each of the respective diodes 27 equal to $\frac{1}{2}(v/f\{_p+f_s(\text{min.})\})$ where $v$ is the known velocity of propagation of electromagnetic waves down the strip line 11, and $f_s$(min.) is the lowest signal frequency to be amplified.

A reflecting strip line portion 41 is connected to the strip line 11 as by directional coupling at a point thereof on the output side of the interaction region, and the strip portion 41 has at its end a terminal resistance 43 of suitable dimensions so as to resistively terminate the pump signal, $f_p$. The pump signal, $f_p$, is reflected into the reflecting strip 41 by means of dividing the path of electromagnetic waves, i.e., the strip line 11 into two closed branches 45 and 47, the branch line 45 being of a length equal to the wavelength of the pump signal frequency, $f_p$, and the branch 47 being of a length equal to one-half the wavelength of $f_p$. Alternatively, a suitable reactive means such as an open-ended ¼ wavelength stub in the strip line 11, or, a shorted half-wave stub, may be used to reactively terminate the pump signal, $f_p$.

In the arrangement shown in FIG. 1, approximately one-half the reflected power will be reflected directionally into the reflecting strip 41 and resistively terminated therein and the other half of the power will be absorbed in the sources of the input and pump signals $f_s$, $f_p$ coupled to the T 13. The portion of the power reflected in the sources for $f_s$, $f_p$ applied to the T 13 will not interfere with the amplifying action of the diodes because the phase relation between the reflected pump $f_p$ and input signal waves $f_s$ will vary continuously.

The sum frequencies of the input and pump signals $f_p+f_s$ are eliminated in the interaction region due to the reactive terminating action of the spaced diodes 27. The waves remaining on the strip line 11 are the difference or idler wave, $f_p-f_s$, the input signal wave $f_s$, and the pump signal wave $f_p$. The pump signal wave $f_p$ is eliminated by the previously described action of the branch lines 45 and 47 and the reflecting strip 41 with resistive termination 43, thus leaving on the strip line 11 only the input signal $f_s$ and the idler signal $f_p-f_s$.

As discussed in the above-cited Manley and Rowe paper, and also by Tien and Suhl, Proc. I.R.E., vol. 46, April 1958, page 700, interaction between the pump signal $f_p$ and the input signal $f_s$ parametrically amplifies the input signal $f_s$. For example, in the case where $f_s=\frac{1}{2}f_p$, and in view of the fact that the pump and signal waves are moving down the strip line 11 at the same velocity so that each of the diodes 27 sees the same phase relationship of pump and signal wave that each previous diode saw, the signal $f_s=\frac{1}{2}f_p$ will grow exponentially depending upon the diode characteristics, mountings and number of stages thereof, and upon the pump signal power. The sign of the exponentially growing wave depends upon the relative phase of the pump and signal waves. In effect, work is done by the pump signal $f_p$ to change the capacitances of the diodes 27 across which the input signal $f_s$ is applied, thereby causing an increase (or decrease) in the amplitude of the input signal $f_s$ depending upon the phase relationship of the pump and input signals.

In some situations it is not desirable or necessary to eliminate the idler frequency, $f_p-f_s$, from the output of the amplifier. However, in order to eliminate the idler frequency, a band stop filter for the idler frequency ($f_p-f_s$) is provided in the strip line 11 in the form of two cuts in the strip line 11 spaced apart by a metallic strip 49 of a length ¼ that of the average wave length of the idler signal wave ($\frac{1}{4}\lambda_i$ avg.). The strip 49 separating the two cuts by $\frac{1}{4}\lambda_i$ avg. produces a condition of substantial anti-resonance in the transmission strip line 11 for the average frequency of the idler frequency, $f_p-f_s$, but passes the higher frequencies of the amplified input signal, $f_s$, which continues traveling down the strip line 11 and may be fed to an output load through any suitable coaxial connection 51 provided at the output end of the strip line 11. The strip line 11 may be suitably tapered at the input and output ends thereof for impedance matching between the strip line 11 and loads coupled thereto.

It is to be understood that if the quality of the variable capacitance diodes 27 is sufficiently high, then no bias will be required therefor. Germanium point-contact diodes of known manufacture may be used. Of course, in order to achieve a wider frequency band of amplifier operating frequencies, further spaced diode stages may be used, it being known that the bandwidth of amplifier operating frequencies increases with an increase in the number of non-linear reactance elements connected into the strip line.

Instead of the particular strip line arrangement herein illustrated, other strip line arrangements may be used. For example, the input signals, $f_s$, may be directly connected through a suitable coaxial coupling to the strip line, and the pump signal, $f_p$, may be coupled thereinto by a hybrid branch line, or vice versa. Suitable filter and reactive termination arrangements other than those illustrated may be used, of course, for eliminating the pump and idler signal waves.

If the parametric amplifier according to the invention is to be followed by a mixer and a local oscillator, the presence of the idler signal $f_p-f_s$ and the sum signal $f_p+f_s$ in addition to the input signal $f_s$ may not be objectionable, and the filters and reactive terminations therefor may accordingly be omitted.

Because of the very wide band of frequencies in the microwave range at which the amplifier according to the invention may be operated, the parametric wave amplifier according to the invention is particularly suitable for use in high speed computer and other equipment requiring wideband, short pulse circuitry. In that logic and storage elements capable of extremely fast operation will millimicrosecond pulses of a microwave carrier have been developed, the compact and simple parametric amplifier of the present invention provides an improved amplification means much less expensive than conventional electron-beam type traveling wave tubes or bounded waveguide type parametric amplifiers.

Obviously many modifications and variations of the present invention are possible in the light of the above teachings. It is therefore to be understood that within the scope of the appended claim the invention may be practiced otherwise than as specifically described.

What is claimed is:

A wide band traveling wave parametric amplifier comprising:

an essentially dispersionless strip transmission line for electromagnetic wave propagation input means for applying an input signal and a pump signal to the said strip line;

a plurality of non-linear reactive elements spaced an interval equal to $\frac{1}{2}(v/f_p+f_s\text{min.})$ where $v$ is the velocity of wave propagation, $f_p$ is the input frequency and $f_s$min. is the lowest frequency of the input signal, for filtering out the sum frequencies $f_p+f_s$;

first and second opposed closed branches, one of said branches being different in length from the other by one-half the wave length of the pump signal, said branches being located in said strip line on the output side of said plurality of non-linear reactive elements;

resistive means coupled to said strip line between the output side of said plurality of non-linear reactive elements and the input side of said opposed branches to cooperate with said closed branches for resistively terminating the reflected pump signal $f_p$;

idler frequency filter means located on the output side of said opposed closed branches, said means comprising two cuts in the said strip line spaced a length equal to $\frac{1}{4}\lambda_i$ avg. where $\lambda_i$ avg. is the average wave length of the idler frequency, $f_p - f_s$, for filtering said idler frequency; and signal output means coupled to said strip line at the output side of said idler frequency means.

References Cited in the file of this patent

UNITED STATES PATENTS

| | | |
|---|---|---|
| 3,008,089 | Uhlir | Nov. 7, 1961 |
| 3,012,203 | Tien | Dec. 5, 1961 |
| 3,045,189 | Engelbrecht | July 17, 1962 |
| 3,092,782 | Chang | June 4, 1963 |

OTHER REFERENCES

Landauer: "Journal of Applied Physics," March 1960, pages 479–484.